(12) United States Patent
Barclay et al.

(10) Patent No.: US 7,325,250 B1
(45) Date of Patent: Jan. 29, 2008

(54) METHOD AND APPARATUS FOR PREVENTING RADIO COMMUNICATION SYSTEM ACCESS BY AN UNAUTHORIZED MODEM

(75) Inventors: Michael Barclay, Swallowcliffe (GB); Brian C. Barnes, Round Rock, TX (US); Terry L. Cole, Austin, TX (US); Rodney Schmidt, Austin, TX (US); David W. Smith, Cedar Park, TX (US); Geoffrey S. Strongin, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 802 days.

(21) Appl. No.: 09/901,421

(22) Filed: Jul. 9, 2001

(51) Int. Cl.
- *G06F 17/00* (2006.01)
- *H04L 9/00* (2006.01)
- *H04L 1/00* (2006.01)
- *H04M 1/66* (2006.01)
- *H04B 7/00* (2006.01)
- *H04B 1/02* (2006.01)

(52) U.S. Cl. .................. 726/14; 713/168; 713/170; 380/247; 380/266; 455/410; 455/411; 455/68; 455/92

(58) Field of Classification Search ............... 713/200, 713/201, 202, 322, 324; 726/14
See application file for complete search history.

(56) References Cited

U.S. PATENT DOCUMENTS

| | | | |
|---|---|---|---|
| 5,642,380 A * | 6/1997 | Lambert | 375/223 |
| 5,878,340 A * | 3/1999 | Asaoka et al. | 455/432.1 |
| 6,122,506 A * | 9/2000 | Lau et al. | 455/427 |
| 6,138,028 A * | 10/2000 | Thoma | 455/466 |
| 6,353,776 B1 * | 3/2002 | Rohrl et al. | 701/1 |
| 6,480,472 B1 * | 11/2002 | Jou et al. | 370/252 |
| 6,556,818 B1 * | 4/2003 | Meehan | 455/406 |
| 6,606,501 B1 * | 8/2003 | Saha et al. | 342/450 |
| 6,748,219 B2 * | 6/2004 | Jokinen | 455/446 |
| 6,782,260 B2 * | 8/2004 | Nakakita et al. | 455/435.1 |

FOREIGN PATENT DOCUMENTS

EP 0619662 A2 * 10/1994

OTHER PUBLICATIONS

Newton, Harry, Newton's Telecom Dictionary, 1998, Telecom Books, 14th Edition, p. 350.*
Park et al, A Fraud Detection Method Using IS-41C Protocols and Its Application to the Third Generation Wireless Systems, 1998, IEEE, pp. 1984-1989.*
Dusche, Mike, Infineon Introduces Worldwide First Smart Card Controller with 64 Kilobytes of EEPROM to Enable Fast Prototyping for Smart Cards, 2000, Business wire, pp. 1-3.*

* cited by examiner

*Primary Examiner*—Gilberto Barrón, Jr.
*Assistant Examiner*—Aravind K Moorthy
(74) *Attorney, Agent, or Firm*—William, Morgan & Amerson, P.C.

(57) ABSTRACT

A method and apparatus for preventing radio communication system access by an unauthorized modem. The apparatus comprises a signal detector that determines if an authorization signal has been received from the base station within a specified period of time. The authorization signal authorizes the apparatus to communicate with the base station. A transmitter transmits information to the base station, and a controller disables the transmitter of the apparatus providing that the authorization signal has not been received within the specified period of time.

25 Claims, 3 Drawing Sheets

METHOD AND APPARATUS FOR PREVENTING RADIO COMMUNICATION SYSTEM ACCESS BY AN UNAUTHORIZED MODEM

BACKGROUND OF THE INVENTION

1. Field of the Invention

The invention relates generally to radio communication systems, and, more particularly, to a method and apparatus for preventing radio communication access by an unauthorized modem.

2. Description of the Related Art

Over the past several years, wireless communication devices have become increasingly popular due in part to the freedom of movement they provide to their users. Wireless communication devices today are found in a variety of forms such as pagers, cellular phones, and with the increasing need for mobile computing, portable computers equipped with a wireless modem are now commonly used as mobile work stations.

Typically, telecommunications services are provided between a cellular telecommunications network and a mobile station over an air interface using radio frequencies. Each subscriber having a mobile station is assigned a unique International Mobile Subscriber Identity (IMSI). At any moment, an active mobile station may be in communication over the air interface with one or more base stations. The base stations are, in turn, managed by base station controllers (also known as radio network controllers). A base station controller together with its base stations comprise a base station system. The base station controllers of a base station system are connected via control nodes to a core telecommunications network, such as the public switched telephone network (PSTN). One type of standardized mobile telecommunications scheme is the Global System for Mobile communications (GSM). GSM includes standards that specify functions and interfaces for various types of services. GSM systems may be used for transmitting both voice and data signals.

A particular base station may be shared among multiple mobile stations. Because the radio spectrum is a limited resource, the bandwidth is divided using a combination of Time-Division and Frequency-Division Multiple Access (TDMA/FDMA). FDMA involves dividing the maximum frequency bandwidth (e.g., 25 MHz) into 124 carrier frequencies spaced 200 kHz apart. A particular base station may be assigned one or more carrier frequencies, and each carrier frequency is divided into time slots. During an active session between the base station and the mobile station, the base station assigns the mobile unit a frequency, a power level, and a time slot for upstream transmissions from the mobile station to the base station. The base station also communicates a particular frequency and time slot for downstream transmissions from the base station destined for the mobile station.

The fundamental unit of time defined in GSM is referred to as a burst period, which lasts 15/26 ms (or approx. 0.577 ms). Eight burst periods are grouped into a TDMA frame (120/26 ms, or approx. 4.615 ms), which is the basic unit for the definition of logical channels. One physical channel is defined as one burst period per frame. Individual channels are defined by the number and position of their corresponding burst periods.

GSM frames, each frame having 8 burst periods, are grouped into superframes (e.g., groups of 51 frames) that include both traffic (i.e., voice or data signals) and control information. The control information is conveyed over common channels defined in the superframe structure. Common channels can be accessed both by idle mode and dedicated mode mobile stations. The common channels are used by idle mode mobile stations to exchange signaling information for changing to dedicated mode in response to incoming or outgoing calls. Mobile stations already in the dedicated mode monitor the surrounding base stations for handover and other information.

The common channels include:
- a Broadcast Control Channel (BCCH) used to continually broadcast information including the base station identity, frequency allocations, and frequency-hopping sequences;
- a Frequency Correction Channel (FCCH) and Synchronization Channel (SCH) used to synchronize the mobile station to the time slot structure of a cell by defining the boundaries of burst periods, and the time slot numbering (i.e., every cell in a GSM network broadcasts exactly one FCCH and one SCH, which are, by definition, sent on time slot number 0 within a TDMA frame);
- a Random Access Channel (RACH) used by the mobile station to request access to the network;
- a Paging Channel (PCH) used to alert the mobile station of an incoming call; and
- an Access Grant Channel (AGCH) used to allocate a Stand-alone Dedicated Control Channel (SDCCH) to a mobile station for signaling (i.e., to obtain a dedicated channel) following a request on the RACH.

For security reasons, GSM data is transmitted in an encrypted form. Because a wireless medium can be accessed by anyone, authentication is a significant element of a mobile network. Authentication involves both the mobile station and the base station. A Subscriber Identification Module (SIM) card is installed in each mobile station. Each subscriber is assigned a secret key. One copy of the secret key is stored in the SIM card, and another copy is stored in a protected database on the communications network that may be accessed by the base station. During an authentication event, the base station generates a random number that it sends to the mobile station. The mobile station uses a random number, in conjunction with the secret key and a ciphering algorithm (e.g., A3), to generate a signed response that is sent back to the base station. If the signed response sent by the mobile station matches the one calculated by network, the subscriber is authenticated. The base station encrypts data transmitted to the mobile station using the secret key. Similarly, the mobile station encrypts data it transmits to the base station using the secret key. After a transmission received by the mobile station is decrypted, various control information, including the assigned power level, frequency, and time slot for a particular mobile station may be determined by the mobile station.

Generally, communication systems are described in terms of layers. The first layer, responsible for the actual transmission of a data-carrying signal across the transmission medium, is referred to as the physical layer (i.e., a hardware component). The physical layer groups digital data and generates a modulated waveform based on the data in accordance with the particular transmission scheme. In GSM, the physical layer generates the transmission waveform, and transmits during the assigned transmit time slot of the mobile station. Similarly, the receiving portion of the physical layer identifies data destined for the mobile station during the assigned receipt time slot.

The second layer, referred to as a protocol layer (i.e., a software component), processes digital data received by the physical layer to identify information contained therein. For example, in a GSM system, decryption of the data is a protocol layer function. Notice that changes in the operating parameters of the physical layer are identified only after decryption and processing by the protocol layer. Although this particular interdependency does not generally cause a problem in a purely hardware implementation, it may cause a problem when all or portions of the protocol layer are implemented in software.

Certain computer systems, especially portable notebook computers, may be equipped with wireless modems. One trend in modern technology involves the use of software modems that implement some of the real-time functions of traditional hardware modems using software routines. Because the hardware complexity of a software modem is less than a hardware counterpart, it is generally less expensive as well as more flexible. For example, the protocol layer decryption and processing may be implemented partially or entirely with software.

Software systems, such as PC systems, run interface control software in operating systems environments as software drivers. These drivers are responsible for communicating to the hardware devices and operate at a privileged level in the operating system. Other software applications are precluded from affecting the drivers. However, because drivers are not protected from other drivers, a variety of problems can occur that might affect the operation of a driver, such as by corrupting its operation. These effects may be caused accidentally, or may be caused by purposeful hacking. A corrupted (or co-opted) driver might cause additional problems outside the computer, such as causing a phone line or wireless channel to be used, operating an external peripheral, or deleting important data.

Because the operating parameters of the physical layer, which control the operation of the transmitter of the mobile station, are controlled by the protocol layer using software, it may be possible for a computer program or virus to take control of the mobile station and cause it to accidentally or purposefully transmit outside of its assigned time slot frequency and/or power level. A wireless communications network, such as a cellular network, relies on a shared infrastructure. A mobile station must adhere to the 'rules of the road' or it may cause interference on the network.

If certain functions of the mobile station are controlled in software, a programmer may determine how the GSM control frames are decoded and how the transmitter module is triggered. A virus may then be written and spread over the network to infiltrate the software-based mobile stations. Then, on a particular time and date, the virus could take direct control of the mobile station and transmit continuously or intermittently and inundate the base stations and other mobile units with random frequencies and full power. Such a virus design could enable and disable at random times to avoid detection, robbing the air-time supplier of some or all of his available bandwidth and may even cause a complete shutdown of the network. Such an attack may take only a few affected devices (i.e., as few as one) per cell to disable the cell completely.

The security problems associated with mobile stations operating in a shared infrastructure may be segregated into three levels of severity: tamper-proof, non-tamperproof, and class break. First, a hardware/firmware implementation (such as a cell-phone) is the hardest with which to tamper, because each device must be acquired individually and modified (i.e., tamper-proof). On the other hand, a software-based solution is easier to tamper with, as a hacker can concentrate on a software-only debugger environment (i.e., non-tamper-proof). Finally, a system with the ability to be tampered with that is similar on all systems and allows the tampering to be distributed to a large number of systems of the same type is susceptible to a 'class-break.'

A software wireless modem is susceptible not only to a class-break, but also it is among those devices whose code may be accessed from the same layer as IP (internet protocol) or another portable code access mechanism. Many software wireless modems may be integrated into computers coupled to networks or the Internet. Such an arrangement increases the susceptibility of the software to being tampered with and controlled.

The present invention is directed to overcoming, or at least reducing the effects of, one or more of the problems set forth above.

SUMMARY OF THE INVENTION

One aspect of the present invention is seen in a device for communicating with a base station of a communication system. The device comprises a signal detector that determines if an authorization signal has been received from the base station within a specified period of time. The authorization signal authorizes the device to communicate with the base station. A transmitter transmits information to the base station, and a controller disables the transmitter of the device providing that the authorization signal has not been received within the specified period of time Another aspect of the present invention is seen in a method for authorizing a user terminal to communicate with a base station in a communication system. The user terminal includes a transmitter for transmitting information to the base station. The method includes determining if an authorization signal has been received at the user terminal within a specified period of time, the authorization signal authorizing the user terminal to communicate with the base station; and disabling the transmitter of the user terminal providing that the authorization signal has not been received within the specified period of time.

BRIEF DESCRIPTION OF THE DRAWINGS

The invention may be understood by reference to the following description taken in conjunction with the accompanying drawings, in which like reference numerals identify like elements, and in which.

Figure 1:
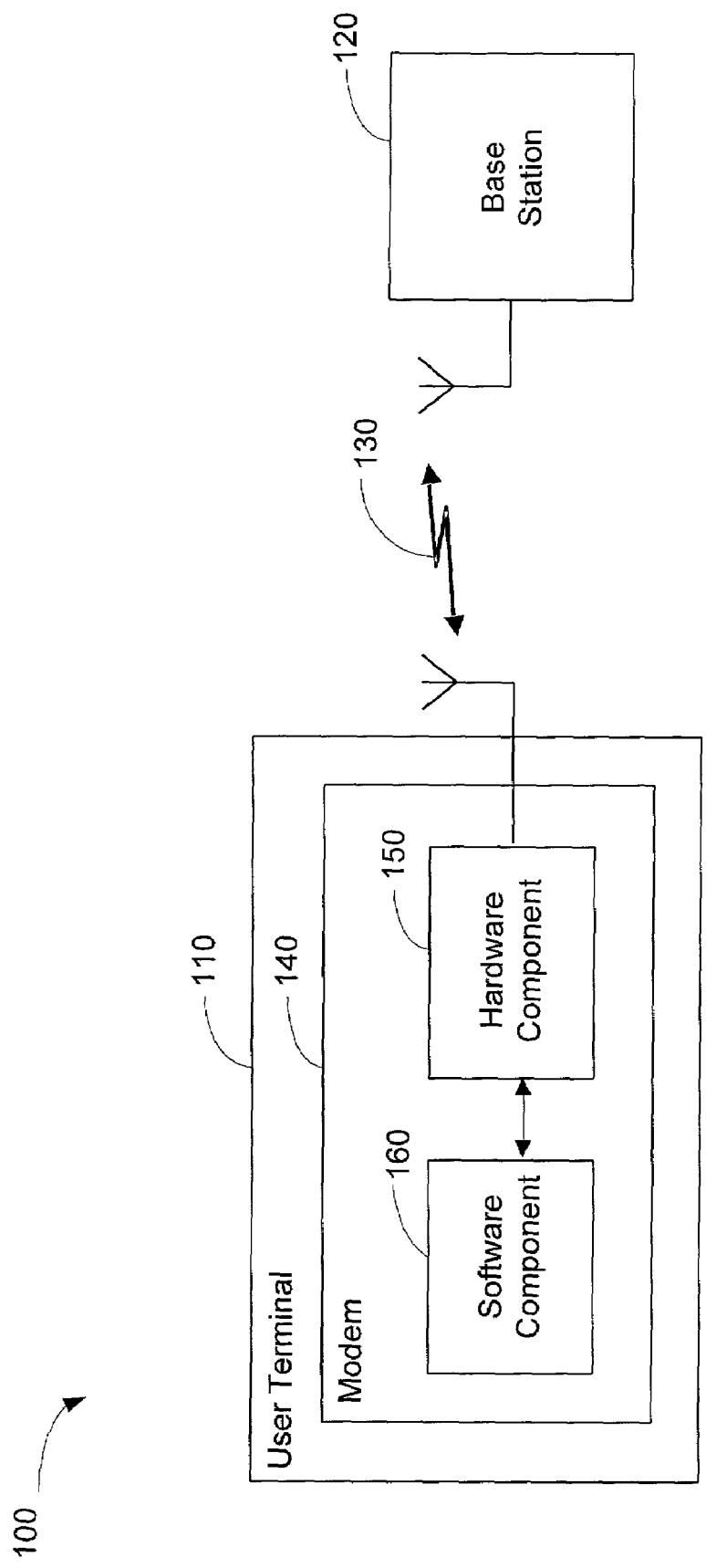
FIG. 1 is a simplified block diagram of a radio communications system, including a user terminal and base station, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a simplified block diagram of a radio communication system 100 is shown in accordance with one embodiment of the present invention. The radio communication system 100 comprises a user terminal 110, which communicates with a base station 120 over a radio communication channel 130. According to one embodiment, the user terminal 110 takes the form of a mobile computing device (such as a portable computer, for example) that includes a wireless software-based modem 140 for communicating in accordance with a particular radio communication protocol over the radio communication channel 130. According to one embodiment, the radio communication protocol operates in accordance with the Global System for Mobile Communications (GSM) standard. It will be appreciated, however, that the communication protocol utilized between the user terminal 110 and the base station 120 may include other types of known wireless communication protocols and, thus, need not necessarily be limited to the GSM standard. It will further be appreciated that although the invention is described as it may be implemented in a wireless environment, its application may be extended to a wired system environment using software implemented communication protocols, such as V.90, ADSL, HomePNA or wireless LAN, for example. Accordingly, in this particular embodiment, the radio communication channel 130 is substituted with a wired communication link.

The base station 120 may serve a plurality of subscribers via other user terminals (not shown), and may be indirectly coupled to other base stations (not shown) via a mobile switching center (not shown). The mobile switching center may further be coupled to a landline telephone network (not shown) to permit data and/or voice communication between the user terminal 110 and another device coupled to the landline telephone network.

In accordance with one embodiment of the present invention, the user terminal 110 may include a variety of computing devices, such as a desktop computer, a notebook computer, a personal digital assistant (PDA), and the like. For purposes of illustration, the user terminal 110 is described as it may be implemented using a notebook computer equipped with a software-based wireless modem 140. According to the illustrated embodiment, the modem 140 is installed as an internal component within the user terminal 110. It will be appreciated, however, that the modem 140 may also be a physically separate component from the user terminal 110 and may be coupled to the user terminal 110 via a connecting cable (not shown).

According to the illustrated embodiment, the modem 140 includes a hardware component (i.e., a physical layer) 150 that is implemented in hardware and a software component (i.e., a protocol layer) 160 that is implemented by software. For purposes of illustration, the functions of the modem 140 are described as they may be implemented for a GSM communication protocol. It will be appreciated, however, that other types of wireless or wired communications protocols may be used in lieu thereof.

The hardware component 150 of the modem 140 is capable of converting digital signals generated at the user terminal 110 into an analog transmit waveform for transmission over the radio communication channel 130 to the base station 120. The hardware component 150 is further capable of converting an incoming analog received waveform over the radio communication channel 130 into digital received signals for processing by the software component 160. For the transmit signals, the output of the software component 160 is the transmit "on-air" information modulated about a zero Hz carrier (i.e., a carrierless signal). The hardware component 150 then mixes or upconverts the carrierless transmit signal generated by the software component 160 in accordance with particular transmission parameters, which may include an assigned time slot, frequency, and power level (communicated to the user terminal 110 by the base station 120) to generate the actual analog waveform that is transmitted to the base station 120. According to the illustrated embodiment, the base station 120 also communicates time slot and frequency assignments to be used over the radio communication channel 130 to the user terminal 110 for incoming data transmitted by the base station 120. The incoming analog receive waveform is sampled and downconverted based on the assigned time slot and frequency parameters to recreate a carrierless receive waveform (i.e., modulated about zero Hz). The software component 160 receives the carrierless receive waveform from the hardware component 150 and performs baseband processing, decryption, and decoding to regenerate the received data.

The particular algorithms used for implementing the software-based modem 140 are described by various industry standards, such as the GSM standard, and are well known to those of ordinary skill in the art. Accordingly, for clarity and ease of illustration, such details are not disclosed herein.

Figure 2:
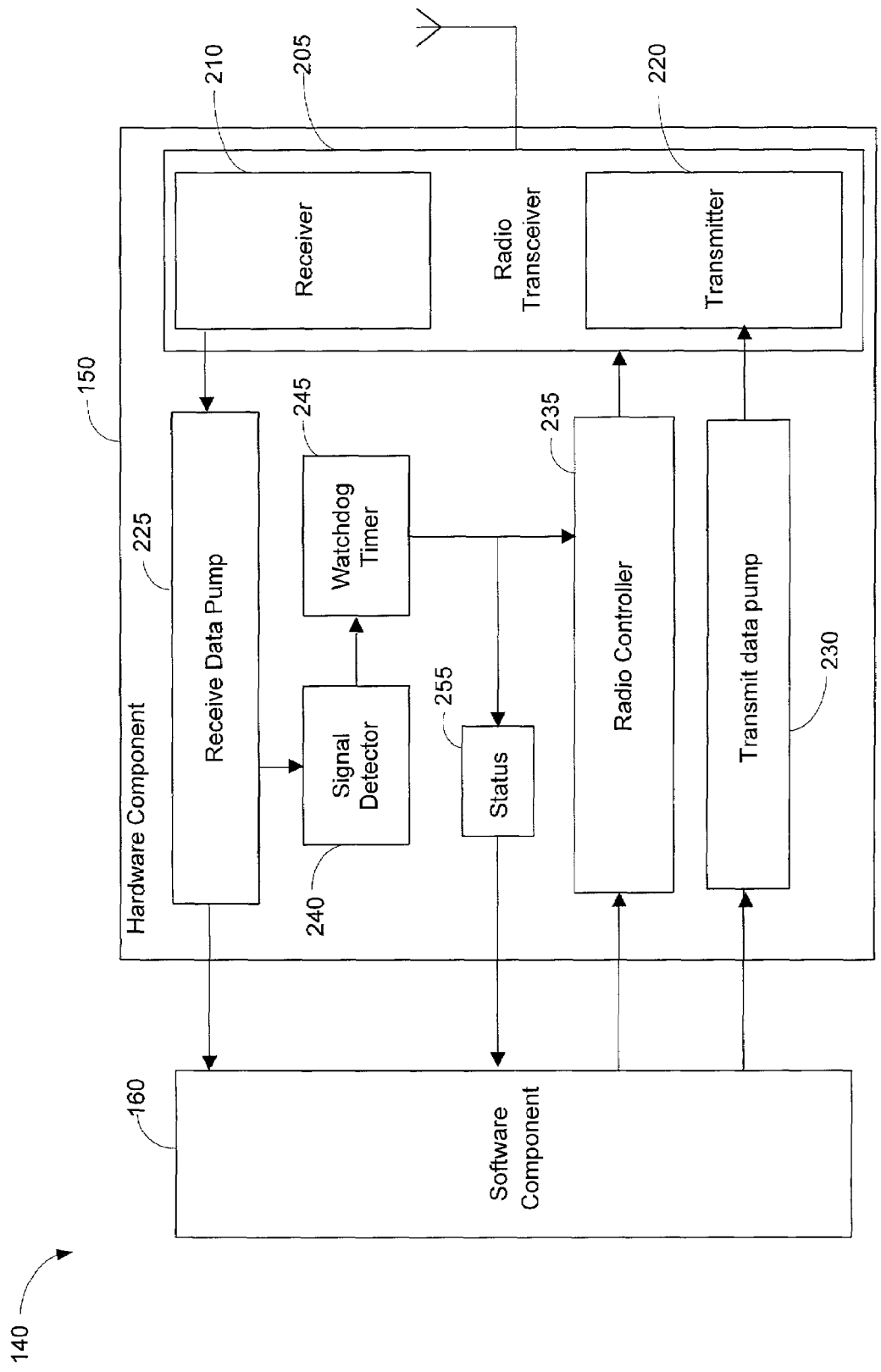
FIG. 2 is a simplified block diagram of a modem included within the user terminal of the communications system of FIG. 1.

Turning now to FIG. 2, a more detailed representation of the wireless modem 140, included within the user terminal 110, is provided. The modem 140 receives and transmits radio signals via a radio transceiver 205, which forms a part of the hardware component 150 of the modem 140. A receiver 210 receives radio signals that are transmitted to the user terminal 110 by the base station 120. The user terminal 110 transmits radio signals to the base station 120 via a transmitter 220. The radio signals received from the base station 120 via the receiver 210 are processed through a receive data pump 225, which forwards the data from the received radio signal to the software component 160 of the modem 140 for further processing (as was previously described). Similarly, data that is originated at the user terminal 110 is sent from the software component 160 to the transmitter 220 via a transmit data pump 230 for transmission to the base station 120. Radio controller 235 receives control code signals from the software component 160 and controls the operation of the radio transceiver 205 in accordance with the control code signals sent from the software component 160 of the modem 140. The control code signals may include particular transmission parameters such as the frequency, time slot and power level at which information (e.g., data) is to be transmitted to the base station 120 over the radio communication channel 130.

In accordance with the illustrated embodiment, the base station 120 periodically transmits an "Authorized to Transmit" signal (hereinafter referred to as an "AT" signal) to the user terminal 110, which authorizes the user terminal 110 to communicate with the base station 120. In one embodiment, the AT signal may be used to prevent the user terminal 110 from transmitting provided that the radio communication system 100 deems that the user terminal 110's communication in the system 100 is unauthorized or otherwise communicating in an improper manner. Such unauthorized or improper use of the radio communication system 100 may include transmission on an unauthorized frequency, time slot and/or power level. It will be appreciated that various other factors may deem the user terminal 110 as operating improperly within the radio communication system 100, and, thus, need not necessarily be limited to the aforementioned examples.

According to one embodiment, the AT signal issued by the base station 120 is transmitted on a specific time slot, frequency or code that is assigned to a particular user terminal 120. The AT signal may be configured as a constant amplitude signal, a constant frequency signal, or a slow amplitude or pulse modulated, time constrained signal. The AT signal may further take the form of a data change on a specific part of a signal that may be easily decoded, such as the pre- or post-amble part of a specific time slot. It will be appreciated that the AT signal transmitted from the base station 120 to the user terminal 110 may take on several other forms, and, thus, need not necessarily be limited to the aforementioned examples. In any event, however, when selecting a particular form for the AT signal, various factors such as hardware cost for detecting the signal at the modem 140 and network capacity constraints on the system 100, for example, should be considered.

According to one embodiment, the AT signal is transmitted from the base station 120 to the user terminal 110 on a periodic basis, which may be every ten seconds, for example. It will be appreciated, however, that the rate of recurrence for transmitting the AT signal by the base station 120 may be more or less frequent depending on factors such as system capacity constraints, for example.

In accordance with one embodiment, the hardware component 150 of the wireless modem 140 comprises a signal detector 240 to detect the AT signal received by the user terminal 110 via its receiver 210. According to the illustrated embodiment, the AT signal is configured to cause the modem 140 from not shutting down or disabling its transmitter 220, thereby permitting communication with the base station 120.

The hardware component 150 of the modem 140 is further configured with a "watchdog" timer 245. According to one embodiment, if the timer 245 times out after a specified period of time, the timer 245 is configured to send a "shutdown" signal to the radio controller 235 to disable the transmitter 220, thereby preventing the user terminal 110 from transmitting messages to the base station 120. When the timer 245 issues a shutdown command to the radio controller 235, the command is also sent to status block 255, where the disabling of the transmitter 220 is communicated to the software component 160 of the modem 140 to indicate that the user terminal 110 is no longer permitted to transmit to the base station 120.

When an AT signal is transmitted from the base station 120 and detected by the signal detector 240, a signal is sent to the timer 245 to restart or re-initialize its clock. If the signal detector 240 does not receive an AT signal from the base station 120 by the time-out of the timer 245, a shutdown signal is sent from the timer 245 to the radio controller 235 to disable the transmitter 220, thereby preventing the user terminal 110 to transmit to the base station 120. In one embodiment, the transmitter 220 of the user terminal 110 may be re-enabled upon receiving an AT signal from the base station 120. In an alternative embodiment, the user terminal 110 may require some form of manipulation from a system operator of the radio communication system 100 to re-enable the transmitter 220. Such manipulation may be in the form of transmitting a specific control code either via a wired or wireless interface with the user terminal 110.

Figure 3:
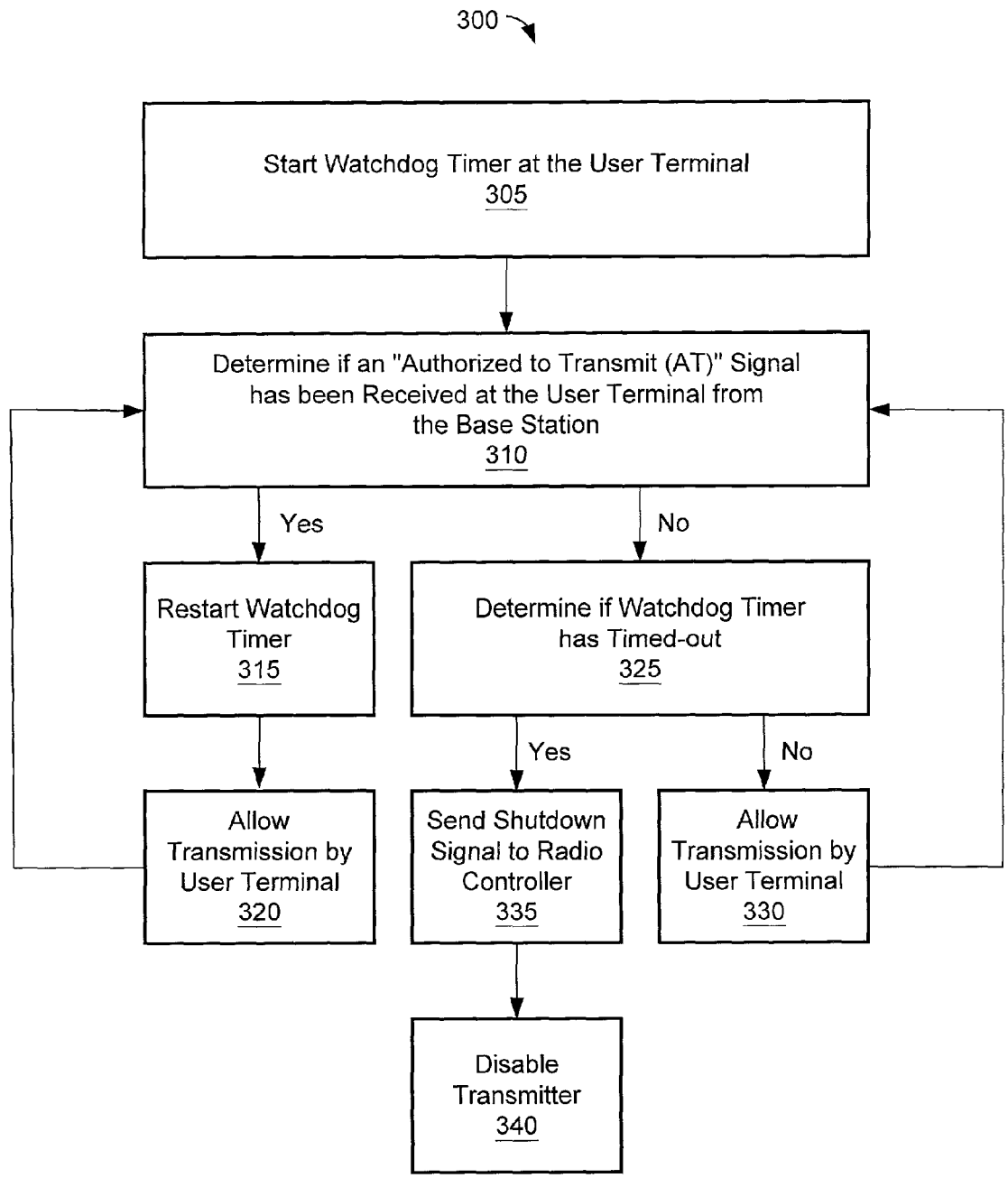
FIG. 3 is a flow diagram of a process for preventing the unauthorized use of the radio communication system of FIG. 1 by the user terminal.

Turning now to FIG. 3, a process 300 for preventing the unauthorized use of a radio communication system 100 by a user terminal 110 is provided. The process 300 commences at block 305 where the watchdog timer 245 of the user terminal 110 starts counting. The timer 245 counts for a specified period of time, and upon expiration of the specified period of time, the timer 245 is considered to have "timed-out." According to the illustrated embodiment, the specified period of time for the timer 245 is set to be for a longer period than the amount of time between two consecutive transmissions of the AT signal by the base station 120.

At block 310, the signal detector 240 of the user terminal 110 determines whether an AT signal has been received from the base station 120. If the AT signal has been detected by the signal detector 240, then a reset command is sent from the signal detector 240 to the timer 245, which restarts its clock to zero at block 315. The radio controller 235 continues to allow the transmitter 220 of the user terminal 110 to transmit data messages to the base station at block 320, and the process 300 reverts back to block 310, where it is again determined if an AT signal (i.e., a second, subsequently transmitted AT signal) has been received at the user station 110 from the base station 120.

If the signal detector 240 has not detected an AT signal from the base station 120, it is determined at block 325 whether the watchdog timer 245 has timed-out (i.e., the specified period of time set for the timer has been exhausted). If the timer 245 has not timed-out, the radio controller 235 at block 330 continues to permit the transmission of data messages from the user terminal 110 to the base station 120 via the transmitter 220. If it is determined that the timer 245 has timed-out at block 325, the watchdog timer 245 sends a shutdown signal to the radio controller 235 at block 335. The timer 245 may also send a status 255 to the software component 160 of the modem 140 indicating that the transmitter 220 of the user terminal 110 has or is about to be disabled. At block 340, the radio controller 235 sends a signal to the radio transceiver 205 to disable the transmitter 220, thereby preventing the user terminal 110 from transmitting data messages to the base station 120. According to one embodiment of the present invention, the transmitter 220 of the user terminal 110 may remain disabled until an AT signal is detected again by the signal detector 240. In an alternative embodiment, the transmitter 220 may remain disabled until an operator of the radio communication system 100 re-initializes the user terminal 110 with a control code, for example. Such re-initializing of the user terminal 110 may be accomplished through a wired communication link or alternatively through the radio communication channel 130, for example.

The AT signal that is periodically transmitted by the base station 120 provides authorization to the user terminal 110 to communicate in the radio communication system 100. When the radio communication system 100 determines that the user terminal 110 is operating improperly within the system 100, it may stop transmitting the AT signal to prevent the user terminal 110 from misusing the system 100. Such misuse of the radio communication system 100 may be the user terminal 110 transmitting on an unauthorized frequency, time slot or power level, for example, as determined by the communication system 100.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for authorizing a user terminal to communicate with a base station in a communication system, the user terminal including a transmitter for transmitting information to the base station, the method comprising:
    determining if an authorization signal has been received from the base station at the user terminal within a specified period of time for the transmission of the authorization signal, the authorization signal authorizing the user terminal to communicate with the base station; and
    disabling the transmitter of the user terminal providing that the authorization signal has not been received within the specified period of time.

2. The method of claim 1, further comprising:
    re-enabling the transmitter of the user terminal upon receipt of the authorization signal.

3. The method of claim 1, wherein determining if an authorization signal has been received at the user terminal within a specified period of time, further comprises:
    starting a timer to count for the specified period of time; and
    determining if the authorization signal has been received at the user terminal prior to the timer expiring at the specified period of time.

4. The method of claim 3, further comprising:
    receiving the authorization signal at the user terminal;
    restarting the timer to count for the specified period of time; and
    permitting the user terminal to transmit information via the transmitter to the base station upon receipt of the authorization signal.

5. The method of claim 4, wherein permitting the user terminal to transmit information further comprises:
    permitting the user terminal to transmit information via the transmitter to the base station upon receipt of the authorization signal until expiration of the specified period of time and non-receipt of a second authorization signal.

6. The method of claim 3, wherein determining if the authorization signal has been received at the user terminal prior to the timer expiring at the specified period of time, further comprises:
    providing a signal to disable the transmitter of the user terminal providing that the specified period of time on the timer has expired; and
    disabling the transmitter of the user terminal.

7. The method of claim 3, wherein determining if the authorization signal has been received at the user terminal prior to the timer expiring at the specified period of time, further comprises:
    permitting the transmission of information from the transmitter of the user terminal to the base station providing it is determined that a second authorization signal has not been received and the specified period of time on the timer has not expired.

8. A device for communicating with a base station of a communication system, the device comprising:
    a signal detector that determines if an authorization signal has been received from the base station at the device within a specified period of time for the transmission of the authorization signal, the authorization signal authorizing the device to communicate with the base station;
    a transmitter that transmits information to the base station; and
    a controller that disables the transmitter of the device providing that the authorization signal has not been received within the specified period of time.

9. The device of claim 8, wherein the device comprises a modem having a software component with software running thereon and a hardware component that includes the signal detector, transmitter and controller.

10. The device of claim 8, wherein the controller is capable of re-enabling the transmitter upon receipt of the authorization signal.

11. The device of claim 8, further comprising:
    a timer capable of counting for the specified period of time; and
    wherein the controller determines if the authorization signal has been received at the device prior to the timer expiring at the specified period of time.

12. The device of claim 11, wherein the authorization signal is received at the device, and wherein the timer restarts to count for the specified period of time, and the controller permits the device to transmit information via the transmitter to the base station upon receipt of the authorization signal.

13. The device of claim 12, wherein the controller further permits the transmission of information via the transmitter to the base station upon receipt of the authorization signal until expiration of the specified period of time on the timer and non-receipt of a second authorization signal at the device.

14. The device of claim 11, wherein the controller disables the transmitter providing that the specified period of time on the timer has expired.

15. The device of claim 11, wherein the transmitter is enabled for the transmission of information to the base station providing a second authorization signal has not been received at the device and the specified period of time has not expired on the timer.

16. The device of claim 8, wherein the device and the base station communicate with each other over a radio communication channel.

17. The device of claim 8, wherein the device and the base station communicate with each other in accordance with a Global system for Mobile Communications (GSM) protocol.

18. An apparatus for authorizing a user terminal to communicate with a base station in a communication system, the user terminal including a transmitter for transmitting information to the base station, the apparatus comprising:
    means for determining if an authorization signal has been received from the base station at the user terminal within a specified period of time for the transmission of the authorization signal, the authorization signal authorizing the user terminal to communicate with the base station; and means for disabling the transmitter of the user terminal providing that the authorization signal has not been received within the specified period of time.

19. The apparatus of claim 18, further comprising:

means for re-enabling the transmitter of the user terminal upon receipt of the authorization signal.

20. The apparatus of claim 18, wherein the means for determining if an authorization signal has been received at the user terminal within a specified period of time, further comprises:

means for starting a timer to count for the specified period of time; and means for determining if the authorization signal has been received at the user terminal prior to the timer expiring at the specified period of time.

21. The apparatus of claim 20, further comprising:

means for receiving the authorization signal at the user terminal;

means for restarting the timer to count for the specified period of time; and means for permitting the user terminal to transmit information via the transmitter to the base station upon receipt of the authorization signal.

22. The apparatus of claim 21, wherein the means for permitting the user terminal to transmit information further comprises:

means for permitting the user terminal to transmit information via the transmitter to the base station upon receipt of the authorization signal until expiration of the specified period of time and non-receipt of a second authorization signal.

23. The apparatus of claim 20, wherein means for determining if the authorization signal has been received at the user terminal prior to the timer expiring at the specified period of time, further comprises:

means for providing a signal to disable the transmitter of the user terminal providing that the specified period of time on the timer has expired; and means for disabling the transmitter of the user terminal.

24. The apparatus of claim 20, wherein the means for determining if the authorization signal has been received at the user terminal prior to the timer expiring at the specified period of time, further comprises:

means for permitting the transmission of information from the transmitter of the user terminal to the base station providing it is determined that a second authorization signal has not been received and the specified period of time on the timer has not expired.

25. The apparatus of claim 18, wherein the apparatus comprises a modem including a software component having software running thereon and a hardware component including the means for determining and the means for disabling.

* * * * *